(12) United States Patent
Chen et al.

(10) Patent No.: US 9,457,420 B2
(45) Date of Patent: Oct. 4, 2016

(54) GAS TUNGSTEN ARC WELDING WITH CROSS AC ARCING TWIN WIRES

(71) Applicant: BEIJING UNIVERSITY OF TECHNOLOGY, Beijing (CN)

(72) Inventors: Shujun Chen, Beijing (CN); Liang Zhang, Beijing (CN); Ning Huang, Beijing (CN); Xuping Wang, Beijing (CN); Zhenyang Lu, Beijing (CN); Fan Jiang, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 407 days.

(21) Appl. No.: 13/917,520

(22) Filed: Jun. 13, 2013

(65) Prior Publication Data

US 2014/0291297 A1 Oct. 2, 2014

(30) Foreign Application Priority Data

Mar. 28, 2013 (CN) .......................... 2013 1 0105174

(51) Int. Cl.
*B23K 9/09* (2006.01)
*B23K 10/02* (2006.01)
*B23K 9/12* (2006.01)
*B23K 9/167* (2006.01)

(52) U.S. Cl.
CPC ................ *B23K 10/02* (2013.01); *B23K 9/09* (2013.01); *B23K 9/124* (2013.01); *B23K 9/167* (2013.01)

(58) Field of Classification Search
CPC .......... B23K 9/10; B23K 9/12; B23K 9/173; B23K 9/18; B23K 9/1735; B23K 10/02
USPC ............................................... 219/74, 121.46
See application file for complete search history.

(56) References Cited

U.S. PATENT DOCUMENTS

2010/0301030 A1* 12/2010 Zhang et al. .............. 219/130.1

* cited by examiner

*Primary Examiner* — Brian Jennison
(74) *Attorney, Agent, or Firm* — J.C. Patents

(57) ABSTRACT

Gas metal arc welding (GMAW) is a widely used process for joining metals. Its main advantage over its competition gas tungsten arc welding (GTAW) is its high productivity in depositing metals. However, to melt metal from the wire to deposit into the work-piece, additional heat is consumed and applied to the work-piece with an uncontrolled fixed proportion to the effective heat that melts the wire. Such additional heat is often in excess of the needed heat input for the work-piece. The side-effects include a waste of the energy, an increased distortion, and possible materials property degradation. This invention is to device a method to transfer this part of heat to melt the wire by adding two wires, which form a pair of arc spots, under a tungsten arc. It also devices a method to assure the arc between the two wires be maintained stable such that the transfer be successfully continuous. The successful continuous transfer improves the energy efficiency, eliminates the adverse effects on the distortion and materials property, and decouples the controls on mass input and heat input on the work-piece.

11 Claims, 2 Drawing Sheets

GAS TUNGSTEN ARC WELDING WITH CROSS AC ARCING TWIN WIRES

CROSS-REFERENCE TO RELATED APPLICATION

This application claims the priority benefit of China application no. 201310105174.X, filed on Mar. 28, 2013. All disclosure of the China application is incorporated herein by reference herein and made a part of this specification.

FIELD OF THE INVENTION

This invention relates to arc welding, and more particularly to gas tungsten arc welding, gas metal arc welding and their variants.

BACKGROUND OF THE INVENTION

Welding technology, which occupies a pivotal position in the manufacturing industry, has been widely used in energy power, transportation, aerospace, marine engineering, heavy machinery and other industries and has become an indispensable manufacturing technology to modern industry. With the rapid development of the national economy, the application of welded products in various sectors of national economy is becoming wider and wider. Replacing welding for riveting, forging, and casting has made welding the dominant method for joining in materials processing and manufacturing. With increasingly high demand on producing high quality welded-products efficiently, traditional welding methods are facing increasing challenges. Highly efficient welding methods are needed to improve welding productivity and weld quality. In recent years, new welding methods have emerged, including high energy laser beam welding, electron beam welding, laser—arc hybrid welding, solid-state welding (Linear friction welding, friction stir welding, etc.). At present, although the welding workload in our country has reached the level as the world leader, our welding efficiency is far lower than those in developed countries. The low degree of automation and lack of efficient welding methods and their implementations are part to claim. Therefore, research and promotion of efficient welding processes and technologies are urgent to improve the competiveness of our manufacturing industry.

Arc welding is a traditional welding method which converts electrical energy into heat energy through the arc process to melt the wire (electrode) or the work-piece to join metals. Arc welding in essence is a heat transfer, mass transfer, and power transmission process. It is a combination of heat, mass and force transmissions. To produce quality welds, such a complex combination must ensure the stability of the arc under challenging operating conditions. With the increased demand on the welding speed, the welding current must be increased in order to improve the melting rate of the wire, i.e., to improve the welding productivity, while reducing the heat input on the work-piece to avoid high-speed associated weld defects. Unfortunately, traditional arc welding processes possess inherent limitation to achieve the desired free control on or free combination of heat input, deposition rate (melting speed) and arc forces acting on the molten pool. The formation and quality of the welds are inevitably affected by undesirable combinations of heat transfer, mass transfer and force transmission. It is thus difficult to guarantee that the welding process would best meet the requirements from various applications. Therefore, efficient welding methods, which apply an automatic control and adjustment of the welding process energy to improve the efficiency of deposition and welding speed while reducing the heat input has become a trend for the development of modern new welding technologies.

Gas tungsten arc welding (GTAW) is a widely used welding process for metal joining Its arc is established between the tip of the non-consumable tungsten electrode and the work-piece with a shielding gas applied to protect the arc and the weld pool area. GTAW can be used in the welding of a wide variety of metals. It is typically used for root passes on pipes and thin gauge materials. Its arc is very stable and can produce high-quality and spatter-free welds without requiring much post-weld cleaning. A typical GTAW system consists of a power supply, a water cooler, a welding torch, cables, etc. For most its applications, direct current electrode negative (DCEN) polarity is used and approximately 70% of the arc heat is applied into the work-piece. Opposite to the direct current electrode positive (DCEP) polarity, the DCEN polarity produces a relatively narrow and deep weld.

However, after the root pass, significant amount of metal is typically needed to fill the groove. Unfortunately, for GTAW, the efficiency to add filler metal into the groove is relatively low. In particular, GTAW currently relies on two most commonly used approaches to fill the metal from the wire: cold wire GTAW process and hot wire GTAW process. In the cold wire GTAW process, the filler wire is directly added as is. To melt the wire faster, in the hot wire GTAW, the filler wire is pre-heated by a resistive heat while it is being fed into the weld pool. This resistive heat is generated by a separate current (typically an alternating-current (AC)) supplied to the filler wire that flows from the wire directly into the weld pool. The current is properly adjusted so that ideally the temperature of the filler wire can reach its melting point as soon as it enters the weld pool. In comparison with the cold wire GTAW, the hot wire GTAW process is more complicated and has a higher cost with the additional power supply, but it can provide a higher deposition rate.

Despite the increased temperature of the filler wire when it enters into the weld pool, the wire melting is still finished by the heat generated from the weld pool during the hot wire GTAW process. That is, part of the heat used to melt the filler wire is essentially absorbed from the weld pool. To melt the wire faster, the arc would have to establish a larger weld pool. Increasing the melting or deposition rate is thus at the expense of an increased weld pool. The arc energy and deposition rate are thus coupled. This coupling reduces the process controllability to provide desirable arc energy and deposition rate freely to meet the requirements from different applications. In addition, for overhead welding where the maximal mass of the weld pool is restricted this coupling also directly reduces the amount of the filler metal that can be added each pass. The productivity is thus directly reduced because of this coupling or undesirable process controllability.

Gas metal arc welding (GMAW) is another widely used arc welding process that can melt the wire highly effectively using an arc spot. If this process is used to melt the wire to deposit metal into the groove, the melting speed can be sufficient. However, in GMAW, the work-piece and wire has the same current. The effective energy consumed on melting wire and that directly applied on the work-piece as additional heat input, where the anode and cathode voltage respectively, hence, wire is deposited at the expense of additional heat which may not be needed by the work-piece. Part of this additional energy becomes a waste. It increases the distortion and material property degradation. This invention thus devices a method to increase this ratio which is referred to as the energy efficiency for deposition application.

SUMMARY OF THE INVENTION

In order to improve welding process capabilities, this patent invents a new welding method, namely Gas Tungsten Arc Welding with cross AC arcing twin wires. This new method possesses excellent feasibilities and controllabilities for flexible controls on arc behavior, melting speed of wires and heat input needed to achieve free combination of heat, mass, and force into/onto the work-piece. In order to achieve the above objectives, the present invention presents following technical solutions: 3

A new welding method using a gas tungsten arc (or PA) with a pair of wires being melted by an inter-wire arc comprising: a gas tungsten arc (or PA) as the main arc between the tungsten and work-piece; the inter-wire arc between the two wires; the inter-wire arc is under the main arc; the main arc and the inter-wire arc cross each other.

The method comprises: establishing a main arc between the tungsten and work-piece to melt the work-piece using an arc terminal; establishing and maintaining an inter-wire arc between the wires to melt the wires using another arc's terminals. The main arc between the tungsten and the work-piece is established first; another arc is then established between the wires within the main arc with the current be supplied by a power supply whose terminals are connected to the two wires respectively. The welding is performed by two separate cross arcs.

The method uses a CC current power supply to provide the inter-wire current; the current of the main arc between the tungsten and work-piece is provided by another CC power supply.

The method uses an AC power supply to provide the inter-wire current; adjusts the AC current waveform to adjust the melting speeds for any of the two wires. The method adjusts the AC current waveform to maintain a stable inter-wire arc: monitoring the voltages between the two wires, between wire I and work-piece, and between wire II and work-piece; assigning two values to define the normal range for each corresponding voltage; using these two values to define the state for the corresponding voltage; using the states of all the voltages to determine if the process is abnormal, if the waveform parameters need to be changed, and how the waveform parameters should be changed.

This welding method differs from all conventional arc welding methods with fundamental distinction in its cross and controllable arcs. The work-piece receives the heat from the arc through an arc spot. In the invented method, one the cross arcs are established, only the main arc imposes an arc spot on the work-piece. It is thus the main arc that controls the heat input into and penetration on the work-piece. The two spots of the inter-wire arc are in the two wires and only melt these two wires. The direct heat input from the inter-wire arc onto the work-piece is thus insignificant. The invented cross-arc welding method can thus realize high deposition with low heat input into the work-piece.

Figure 1:
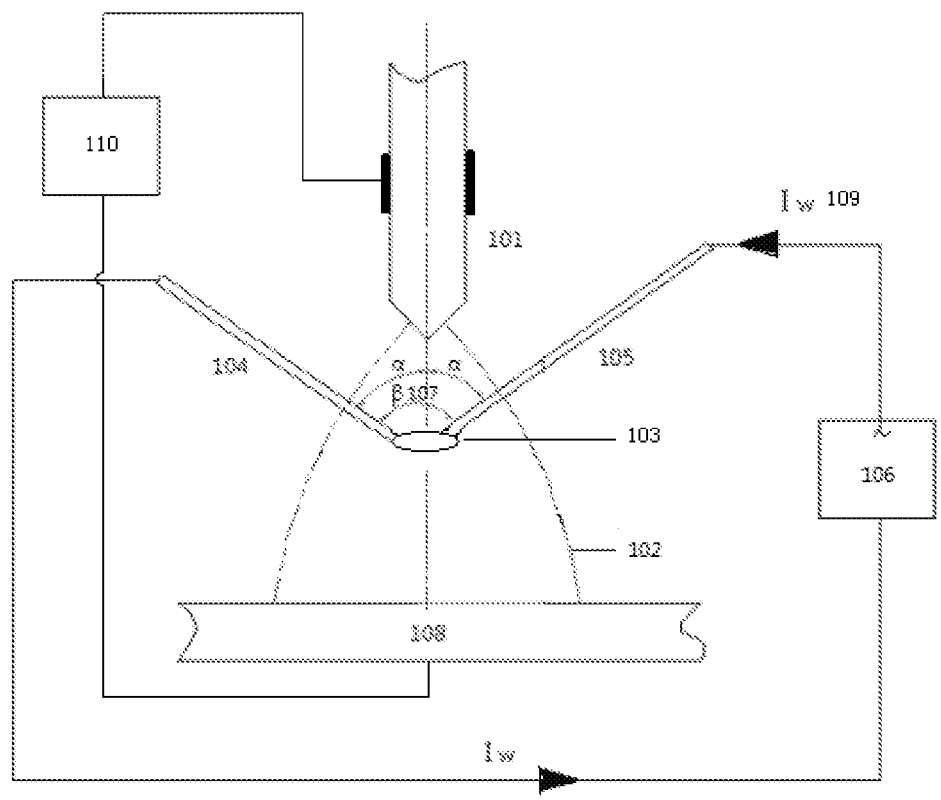
FIG. 1 shows the cross-arc welding system.
Figure 2:
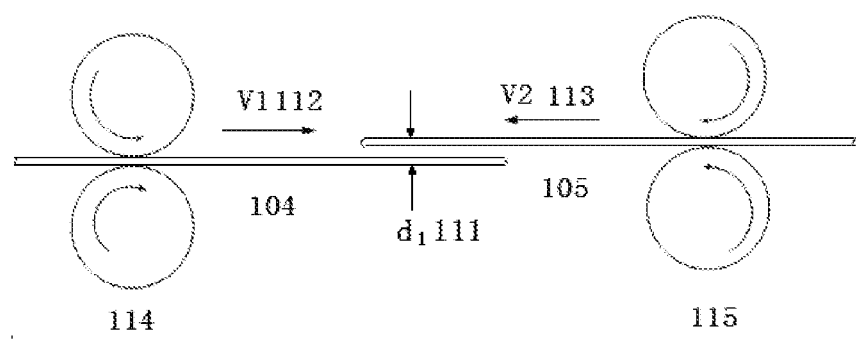
FIG. 2 demonstrates the feeding of the two wires.
Figure 3:
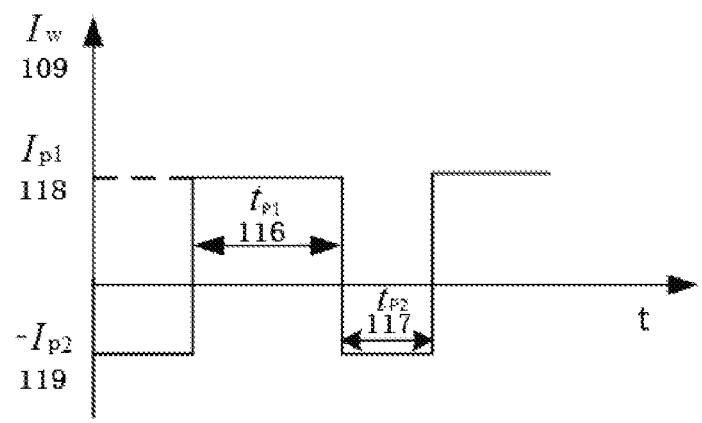
FIG. 3 illustrates the AC current waveform.

101, GTAW (PAW) torch, 102, the main arc, 103, the inter-wire arc, 104, wire I, 105, wire II, 106, AC welding power, 107, two wire angle, 108, work-piece, 109, the wire current, 110, GTAW (PAW) power, 111, the distance between the two wires, 112, the speed of wire I, 113, the speed of wire II, 114, wire feeder I, 115, wire feeder II, 116, the peak time of the positive pulse current, 117, the peak time of the negative pulse current, 118, the peak current of the positive pulse current, 119, the peak current of the negative pulse current, 120, two wires cross point, 121, the distance between cross-point and work-piece, 122, the distance between wire I tip and the work-piece, 123, the distance between wire II tip and the work-piece.

DETAILED DESCRIPTION OF THE EMBODIMENTS

The tungsten 101 establishes a gas tungsten arc (or PA) 102 with the work-piece 108. Wire I 104 and wire II 105 are fed into the GTA (or PA) 102 environment from opposite sides. Wire I 104 and wire II 105 are connected to an alternate-current (AC) power supply 106. The extensions of the two wires form a crossing angle $\beta=2\alpha$ 107 where $\alpha$ is the angle of each wire with the tungsten 101.

The distance between the extensions of the two wires is $d_1$ 111. Due to the GTA (or PA), the wires are not insulated and ionized plasma exists in the gap defined by $d_1$ 111. An arc, i.e., the inter-wire arc 103, can be established if the AC power supply 106 supplies a non-zero wire current Iw 109. The anode and cathode of this inter-wire arc 103 will melt the two wires 104 and 105. As a result, almost all the energy supplied by the inter-wire arc 103 will be consumed on melting the wires without energy be wasted. In addition, the wires can be melted at any reasonably high speeds by increasing the wire current 109.

Two wire feeders 114 and 115 feed the two wires 104 and 105 at the same nominal speed but the actual speeds $v_1$ 112 and $v_2$ 113 may be different. Since the two wires have the same current Iw, but different arc spot voltages (one for the anode and another for the cathode), the wire current Iw needs to be AC such that the arc spots will alternate on the two wires to keep their melting speeds approximately the same.

The waveform of the AC power supply will be adjustable. The current Iw 109 has a positive amplitude $I_{p1}$ 118 with a duration $t_{p1}$ 116 and a negative amplitude $I_{p2}$ 119 with a duration $t_{p2}$ 117. The adjustability implies the possibility for unequal $I_{p1}$ and $I_{p2}$ and for unequal $t_{p1}$ and $t_{p2}$. It further implies that all of these can be adjusted in real-time. To maintain the inter-wire arc to be stable, these parameters may need to be adjustable.

The method reduces the precision on the joint preparation including joint gap and groove. All the torches are placed in the same side of the work-piece with the GTWA torch above the two wires being fed into the main arc from opposite sides by two welding feeders. The installation parameters need to be carefully adjusted to ensure the two arcs to cross each other. The welding torch, wires and work-pieces are respectively connected to the corresponding circuit loop. The welding parameters in each loop can be appropriately selected to meet the requirements by the needed cross arcs.

First, adjust the parameters of the main arc and the inter-wire arc, then the main arc is established between the torch and the work-piece, when the main arc is stable, the inter-wire arc is established between the wires. In the invention the heat input of the work-piece is controlled by the main arc, the deposition is controlled by the inter-wire arc, two arc parameters can be adjusted separately. The invention get implemented a free combination of welding heat input, force and metal transfer.

Now the average power adjustment is discussed. Keep the convention to use wire I as the reference to define the sign for the wire current. That is, a positive $I_w$ implies wire I as the anode and wire II as the cathode. Since the waveform for the wire current is defined by four parameters, the average powers for the two wires can be independently adjusted.

Hence, the average power on wire I is $$P_1 = \frac{I_{p1}t_{p1}V_a + I_{p2}t_{p2}V_c}{t_{p1} + t_{p2}}$$

The average power on wire II is $$P_2 = \frac{I_{p2}t_{p2}V_a + I_{p1}t_{p1}V_c}{t_{p1} + t_{p2}}$$

Figure 4:
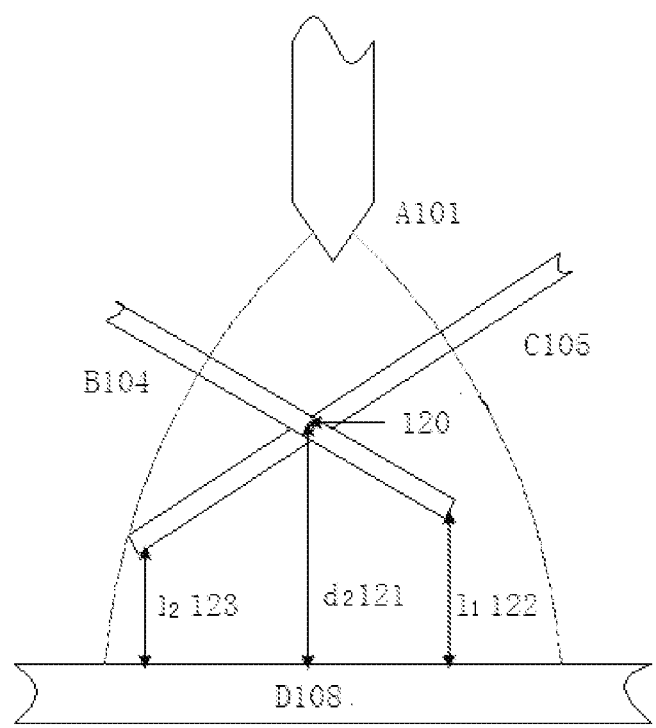
FIG. 4 details the principle of the cross-arc system.

Maintaining a stable inter-wire arc requires the wire melting speed equals the feeding speed in accumulation. Referring to FIG. 4, this requires the two wire tips are approximately at the crossing point 120. The distance from the crossing point 120 to the work-piece 108 is $d_2$ 121. Hence, the distances from each wire to the work-piece, i.e., $l_1$ 122 and $l_2$ 123 need to be both equal to $d_2$ 121.

A practical method is needed to monitor these distances in addition to the inert-wire distance $d_1$. To this end, the voltage between wire I 104 and work-piece 108 is $V_{BD}$, the voltage between wire II 105 and work-piece 108 is $V_{CD}$, the voltage between wire I 104 and wire II 105 is $V_{BC}$ which can be measured and be used to determine the stability of the inter-wire arc. To this end, three characteristic values are defined for each voltage. These three characteristic values define 3 states.

TABLE 1

The values of $V_{BD}$, $V_{CD}$ and $V_{BC}$

|  | 0 | Min V | Max V |
| --- | --- | --- | --- |
| $V_{BC}$ | 0 | 24 V | 50 V |
| $V_{BD}$ | 0 | 12 V | 25 V |
| $V_{CD}$ | 0 | 12 V | 25 V |

(1) $V_{BC}$: 0, min$V_{BC}$, max$V_{BC}$. Short-circuit state: $V_{BC}$ = 0; low voltage state: 0 < $V_{BC}$ < min$V_{BC}$; normal voltage stage: min$V_{BC}$ ≤ $V_{BC}$ ≤ max$V_{BC}$; high voltage state: $V_{BC}$ > max$V_{BC}$. Here [min$V_{BC}$, max$V_{BC}$] defines the normal desirable range for the inter-wire voltage $V_{BC}$, thus the normal range for the inter-wire distance.
(2) $V_{BD}$: 0, min$V_{BD}$, max$V_{BD}$. Short-circuit state: $V_{BD}$ = 0; low voltage state: 0 < $V_{BD}$ < min$V_{BD}$; normal voltage stage: min$V_{BD}$ ≤ $V_{BD}$ ≤ max$V_{BD}$; high voltage state: $V_{BD}$ > max$V_{BD}$. Here [min$V_{BD}$, max$V_{BD}$] defines the normal desirable range for the voltage $V_{BD}$ between wire 1 and work-piece, thus the normal range for the distance $l_1$.
(3) $V_{CD}$: 0, min$V_{CD}$, max$V_{CD}$. Short-circuit state: $V_{CD}$ = 0; low voltage state: 0 < $V_{CD}$ < min$V_{CD}$; normal voltage stage: min$V_{CD}$ ≤ $V_{CD}$ ≤ max$V_{CD}$; high voltage state: $V_{CD}$ > max$V_{CD}$. Here [min$V_{CD}$, max$V_{CD}$] defines the normal desirable range for the voltage $V_{CD}$ between wire 2 and work-piece, thus the normal range for the distance $l_2$.

Short-circuit is an extreme state. If there is no any short-circuit state for any of the three voltages, the states can be used to determine how the process deviates from the desirable range and how the welding parameters need to be adjusted to maintain a stable inter-wire arc. To this end, write the voltages into a vector V=($V_{BC}$, $V_{BD}$, $V_{CD}$). To be concise, for each state, "voltage state" is dropped and only the keywords, low, normal or high, are kept.

When the inter-wire voltage is low or normal, there will be the following 9 states:
(1) V=(low or normal, low, low) indicates a small or normal $d_1$, a small $d_1$, and a small $l_2$. For small $d_1$ (small inter-wire distance), nothing needs to be adjusted as long as $d_1$ is not continuously zero. Hence, "low" and "normal" can be grouped together for the voltage representing the inter-wire distance. For a small $l_1$, wire I needs to be melt faster. This can be done by increasing the average power on wire I, i.e., $P_1$. For a small $l_2$, wire II needs to be melt faster. This can be done by increasing the average power on wire II, i.e., $P_2$. The method to independently adjust $P_1$ and $P_2$ will be introduced later.
(2) V=(low or normal, normal, low) indicates a small or normal $d_1$, a normal $l_1$, and a small $l_2$. In this operation state defined by V, $P_1$ needs no changes but $P_2$ needs to be increased to melt wire II faster.
(3) V=(low or normal, normal, normal) indicates a small or normal $d_1$, a normal $l_1$, and a normal $l_2$. In this operation state defined by V, no changes are needed.
(4) V=(low or normal, normal, high) indicates a small or normal $d_1$, a normal $l_1$, and a large $l_2$. In this operation state defined by V, $P_1$ needs no changes but $P_2$ needs to be decreased to melt wire II slower.
(5) V=(low or normal, low, normal) indicates a small or normal $d_1$, a low $l_1$, and a normal $l_2$. In this operation state defined by V, $P_2$ needs no changes but $P_1$ needs to be increased to melt wire I faster.
(6) V=(low, high, normal) indicates a small or normal $d_1$, a high $l_1$, and a normal $l_2$. In this operation state defined by V, $P_2$ needs no changes but $P_1$ needs to be decreased to melt wire I slower.
(7) V=(low or normal, low, high) indicates a small or normal $d_1$, a low $l_1$, and a high $l_2$. In this operation state defined by V, $P_1$ needs to be increased to melt wire 1 faster and $P_2$ needs to be decreased to melt wire II slower.
(8) V=(low or normal, high, high) indicates a small or normal $d_1$, a high $l_1$ and a high $l_2$. In this operation state defined by V, both $P_1$ and $P_2$ need to be decreased to melt wires slower.
(9) V=(low or normal, high, low) indicates a small or normal $d_1$, a high $l_1$, and a low $l_2$. In this operation state defined by V, $P_1$ needs to be decreased to melt wire I slower and $P_2$ needs to be increased to melt wire II faster.

The above 9 operation states defined by the value of vector V are considered normal operation states without extreme conditions. The controls needed are summarized in Table 2.

TABLE 2

Control Actions under Normal Operation States with Low or Normal Inter-wire Voltage*

|  | $V_{CD}$ = low | $V_{CD}$ = normal | $V_{CD}$ = high |
| --- | --- | --- | --- |
| $V_{CD}$ = low | Increase $P_1$ and $P_2$ | Increase $P_1$ | Increase $P_1$, decrease $P_2$ |
| $V_{CD}$ = normal | Increase $P_2$ | No change | Decrease $P_2$ |
| $V_{CD}$ = high | Decrease $P_1$, increase $P_2$ | Decrease $P_1$ | Decrease $P_1$ and $P_2$ |

*$V_{BC}$ = low and normal and $V_{BD}$≠0, $V_{CD}$≠0.

When the inter-wire voltage is high, there will be the following four states:
(1) V=(High, low or normal, low or normal) indicates that the two wires have crossed or very close to cross and the high inter-wire voltage is caused by the large distance between wires. In this case, the torch alignment is needed.

(2) V=(High, high low or normal) indicates that the two wires have not crossed or very close to cross due to the large distance from wire I to the work-piece. In this case, $P_1$ needs to be decreased to melt wire I slower.

(3) V=(High, low or normal, high) indicates that the two wires have not crossed or very close to cross due to the large distance from wire II to the work-piece. In this case, $P_2$ needs to be decreased to melt wire II slower.

(4) V=(High, high, high) indicates that the two wires have not crossed or very close to cross due to the large distance from wire II to the work-piece and the large distance from wire II to the work-piece. In this case, both $P_1$ and $P_2$ need to be decreased to melt wire I and wire II slower.

TABLE 3

Diagnosis and Controls under High Inter-Wire Voltage with No Short-Circuit

| | $V_{CD}$ = low or normal | $V_{CD}$ = high |
|---|---|---|
| $V_{BD}$ = low or normal | Inter-wire distance $d_1$ too large | Decrease $P_2$, increase $P_1$ if $V_{BD}$ = low |
| $V_{BD}$ = high | Decrease $P_1$, Increase $P_2$ if $V_{BD}$ = low | Decrease $P_1$ and $P_2$ |

*$V_{BC}$ = high, $V_{BD} \neq 0$, $V_{CD} \neq 0$.

When the inter-wire voltage is zero, (1) V=(zero, zero, zero) indicates that two wires both touch the work-piece. Both $P_1$ and $P_2$ need to be increased to melt the wires faster. If increasing $P_1$ and $P_2$ does not change the state, the operation is abnormal; if the state is changed, the control and diagnosis will be processed based on the new state.

(2) V=(zero, zero, non zero) indicates that the inter-wire distance is zero and wire I touches the work-piece. This state will be abnormal because of the zero inter-wire distance.

(3) V=(zero, non zero, zero) indicates that the inter-wire distance is zero and wire II touches the work-piece. This state will be abnormal because of the zero inter-wire distance.

(4) V=(zero, non zero, non zero) indicates that the inter-wire distance is zero. This state will be abnormal because of the zero inter-wire distance.

TABLE 4

Diagnosis and Control under Zero Inter-Wire Voltage Condition*

| | $V_{CD}$ = Zero | $V_{CD}$ = Non Zero |
|---|---|---|
| $V_{BD}$ = Zero | Increase $P_1$ and $P_2$ | Inter-wire distance $d_1$ = 0 |
| $V_{BD}$ = Non Zero | Inter-wire distance $d_1$ = 0 | Inter-wire distance $d_1$ = 0 |

*$V_{BC}$ = 0

What is claimed is:

1. A method for gas tungsten arc welding, comprising:
   providing a non-consumable tungsten, a work-piece, a first consumable wire and a second consumable wire;
   generating a gas tungsten arc as a main arc between the non-consumable tungsten and the work-piece by providing a first power supply therebetween;
   generating an inter-wire arc between the first and second consumable wires by providing a second power supply therebetween;
   wherein the inter-wire arc is located between the non-consumable tungsten and the work-piece and passes a central axis between a tip of the non-consumable tungsten and a welding spot on the work-piece, and the first and second consumable wires are not electrically wired to the non-consumable tungsten.

2. The method in claim 1, wherein the first and second consumable wires have their crossing point at which they have the shortest distance under the main arc.

3. The method in claim 1, wherein the first and second consumable wires are fed from opposite directions toward the main arc.

4. The method in claim 1, wherein the non-consumable tungsten is held by a gas tungsten arc (GTAW) or plasma arc welding (PAW) welding torch.

5. The method in claim 1, wherein an inter-wire current between the first and second consumable wires is provided by the second power supply which is a constant-current power supply or constant-voltage power supply.

6. The method in claim 1, wherein, in use, the main arc between the non-consumable tungsten and the work-piece is established first for melting the work-piece and, then, the inter-wire arc between the first and second consumable wires is established for melting the first and second consumable wires.

7. The method in claim 1, comprising:
   providing an AC power supply as the second power supply between the first and second consumable wires to form an inter-wire current;
   adjusting waveform of the AC power supply to adjust melting speed of any of the first and second consumable wires.

8. The method in claim 1, wherein the inter-wire arc is completely located within the main arc and symmetrically distributed around the central axis.

9. The method in claim 1, wherein the first and second consumable wires are symmetrically positioned at opposite sides of the main arc around the central axis.

10. The method in claim 1, wherein the first and second consumable wires have the same current.

11. The method in claim 10, wherein the current of the first and second consumable wires is an AC current.

* * * * *